J. N. NEAL & R. T. VAN VALKENBURG.
FARM GATE.
APPLICATION FILED APR. 15, 1911.
1,001,976.
Patented Aug. 29, 1911.
2 SHEETS—SHEET 2.
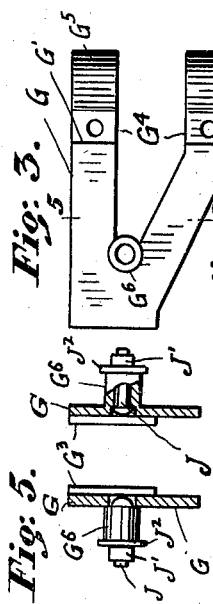
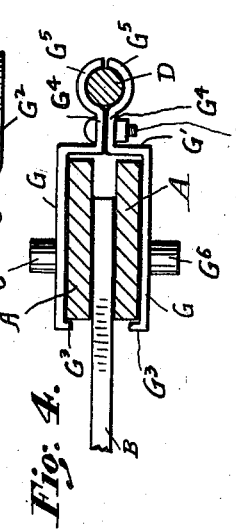
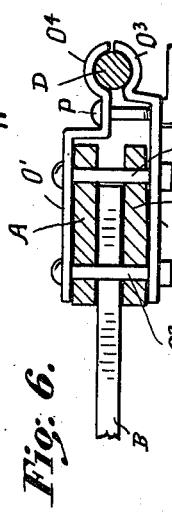
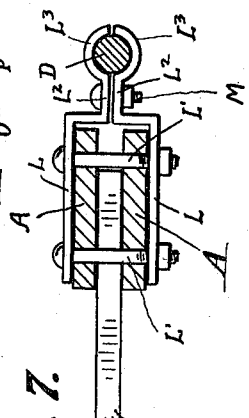
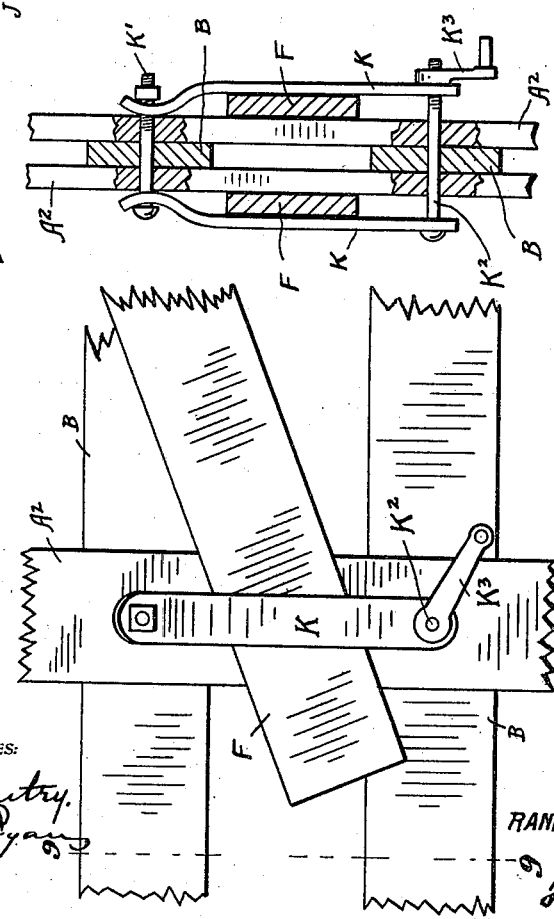
WITNESSES:
INVENTORS,
JOHN N. NEAL.
RANDALL T. VANVALKENBURG.
BY
ATTORNEY

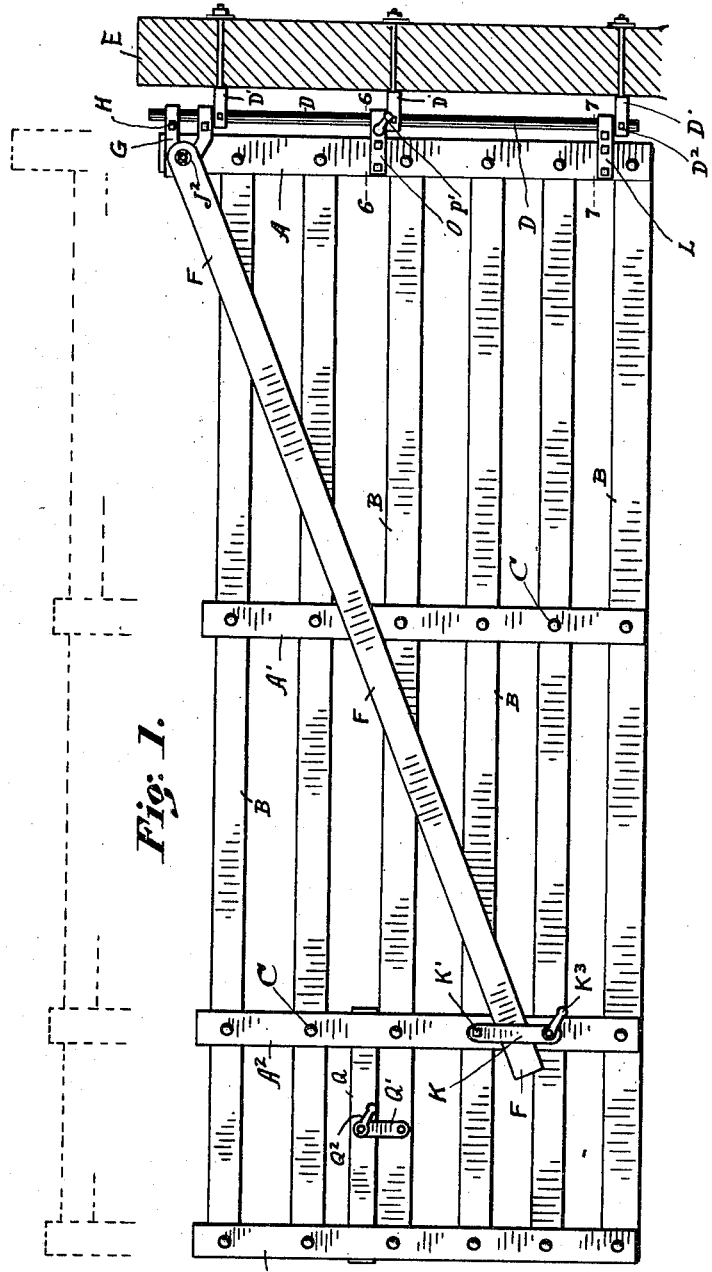

UNITED STATES PATENT OFFICE.

JOHN N. NEAL AND RANDALL T. VAN VALKENBURG, OF MUNCIE, INDIANA.

FARM-GATE.

1,001,976.          Specification of Letters Patent.      Patented Aug. 29, 1911.

Application filed April 15, 1911. Serial No. 621,184.

*To all whom it may concern:*

Be it known that we, JOHN N. NEAL and RANDALL T. VAN VALKENBURG, citizens of the United States, residing at Muncie, in the county of Delaware and State of Indiana, have invented certain new and useful Improvements in Farm-Gates, of which the following is a specification.

This invention relates to improvements in farm gates, and refers more especially to that class of gate which is capable of being raised and lowered and of being sustained at different raised or lowered positions, and which gate also is capable of having its free end raised and lowered and of being supported at different raised or lowered positions.

The objects of this invention are to so improve the construction of this class of gate that the amount and weight of material going into same, and the amount of workmanship necessary in constructing the gate will be materially reduced, and at the same time the gate will be strong and durable, easy to assemble, and not liable to get out of order or repair.

Our improved gate and the details used in its construction are shown in the annexed drawings.

In the several views of the drawings the different parts of the invention are designated by suitable characters of reference.

Figure 1 is a side view and Fig. 2 is an end view of our improved gate complete. Fig. 3 is an enlarged side view, and Fig. 4 is a plan view of the yoke. Fig. 5 is a transverse sectional view taken on the line 5—5 in Fig. 3. Fig. 6 is an enlarged sectional view taken on the line 6—6 in Fig. 1. Fig. 7 is an enlarged sectional view taken on the line 7—7 in Fig. 1. Fig. 8 is an enlarged side view of the connecting means for the brace bars. Fig. 9 is a transverse sectional view taken on the line 9—9 in Fig. 8.

The main upright A, and each of the other uprights $A^1$, $A^2$ and $A^3$ are composed of a pair of members consisting of boards about four inches by one inch in cross section. Between the members composing these uprights are arranged the rails B composed of boards about four inches by one inch in cross section. The rails and uprights are held together in the frame like form as shown, by bolts C. Now the purpose of this present invention is to render this gate frame capable of being easily raised or lowered and of being supported at varied raised or lowered positions, and also to render possible the raising or lowering of the free end only of the gate and supporting it in varied raised or lowered positions. To accomplish these advantages, retaining all the time the simple form of gate frame described and providing such structure and details as do not materially increase the weight of the gate frame or add materially to the cost of manufacture of same, are the more specific objects of our invention. These objects and advantages are obtained by the new construction, combination and arrangement of parts now to be described.

D designates a hinge rod. This hinge rod performs several functions and is an important part of our improved gate. This hinge rod is made of iron or steel of proper quality and diameter and is provided with the arms $D^1$ capable of being secured by set screws $D^2$ or by being shrunk on the rod. The free ends of these arms are preferably of the form as shown in Fig. 1 and are thus capable of being secured readily to a fence post E of almost any structure. Modified forms of these arms may of course be used without affecting the nature of our invention.

Adapted to have bearing on the upper one of the arms $D^1$ is a yoke whose function is to provide a housing in which the main upright A is free to move vertically, and to serve as a hinge support for the gate frame, and also to serve as a support for the upper ends of the brace bars F. The structure of this yoke will be readily understood by reference to Figs. 3 and 4; it is composed of the two members G made of right and left form. Each of these members is of the dimension and form as shown, and has the angular portions $G^1$ and $G^2$ and the lip $G^3$ so formed that when the said members are laid up to the opposite sides of the main upright A and the necks $G^4$ are brought together and secured by bolts H, the half eyes $G^5$ will loosely engage the hinge rod D and the main upright A will be loosely engaged by the sides of the yoke. These yoke sides are made of malleable iron and formed integral therewith are bosses $G^6$. These bosses are of depth slightly greater than the thickness of the brace bars F and are so formed at their bases with reference to the body portions of the yoke sides, that when bolts J are passed through the perforations in said bosses the heads of said bolts will be countersunk in the space between the body sections. That is to say, the head of the bolt of each side of the yoke will be countersunk and out of the way of the upright A, as plainly shown in Fig. 5.

The upper ends of the brace bars are bored so as to fit over the bosses $G^6$ and when the nuts $J^1$ are screwed down on the washers $J^2$ that fit on top of the bosses, the brace bars will be retained in position perfectly free to move hinge-like on the bosses. To do away with the necessity of boring or slotting said brace bars, and to provide a detail whereby these brace bars may be securely gripped, and as easily released, we have constructed the connection detail shown in Figs. 8 and 9. The bars K are similar and have their ends so formed that when the upper bolt $K^1$ is tightened the effect is to spread the bars K, the lower bolt $K^2$ having been first slightly loosened by the wing nut $K^3$. There is now no engripment of the brace bars and the forward end of the gate may be easily raised. To lock same at the raised position it is only necessary to operate the wing nut $K^3$ which causes the bars K to tightly grip the brace bars.

Near the lower end of the upright A is a hinge member which forms the bearing for the gate at the lower one of the arms $D^1$. This hinge member consists of two metal bars L so formed that when the body portions are secured to the sides of the main upright A by the bolts $L^1$, and the necks $L^2$ are secured together by the bolts M the half eyes $L^3$ will loosely engage the hinge bar.

At a location on the upright A between the yoke and the hinge member is a clamp hinge composed of two bars O and $O^1$ bent into the form shown and secured in position by the bolts $O^2$. By reference to Fig. 6 the specific construction of this clamp hinge may be readily understood. When the gate frame occupies the normal position shown, this clamp hinge serves merely the function of a hinge member, but when the gate is raised to the dotted line position it serves as a clamp whereby the gate may be sustained at the raised position. The bar $O^1$ is of the same form as one of the bars L; the body portion of the bar is straight in extent to a point where it is turned at an angle and there is formed the half-eye $O^3$ that will register with the half eye $O^4$. P designates a bolt that connects the two bars O and $O^1$. When this clamp hinge is serving merely as a hinge the wing nut $P^1$ is turned down on the bolt P sufficiently only to hold the half eyes in loose engagement with the hinge bar. When the gate is lifted to the height desired, the wing nut $P^1$ is turned down on the bolt P which causes the half eyes $O^3$ and $O^4$ to tightly grip the hinge bar.

Disposed with its ends between the uprights $A^2$ and $A^3$ is the latch bar Q. Links $Q^1$ connect it to the rail B, and it may be held at forward, neutral, or reverse position by tightening the wing nut $Q^2$.

From the foregoing description it is readily apparent that we have perfected a gate that is exceedingly economical and simple of manufacture, and one which is capable of being easily assembled and installed, and which will not be liable to get out of order or repair.

The several parts of the gate when at normal closed position, appear as shown in Fig. 1. The gate frame being supported by the hinge member and the yoke member and being free to swing on the hinge bar, the forward end of the gate frame may be supported at raised position to permit the passing of small stock, the clamping or securing of the ends of the brace bars F being accomplished by manipulating the wing nut $K^3$ as hereinbefore described.

It is sometimes necessary to sustain the entire gate frame at raised position such as shown by the dotted lines. This advantage is very effectively accomplished by our invention. The gate frame having been lifted to the height desired the wing nut $P^1$ is operated which causes the half eyes $O^3$ and $O^4$ to tenaciously grip the hinge bar, and thus the gate frame will be sustained at position. It will be understood of course that in all of the operations incident to raising or lowering the gate, the clamping means for the brace bars is accordingly adjusted.

With the novel combination, arrangement and construction of parts and details, it is necessary that very small amount of workmanship be done on the wooden parts or members, large holes, slots, notches and other objectionable cutting away of the wood sections have been dispensed with, making the gate simple and economical of construction and installation, and strong to withstand the wear and tear of general usage, and the ravages of the elements.

What we claim is:—

1. In a gate of the kind described, the combination of a hinge bar, a gate frame, a main upright on said gate frame, a yoke having loose connection with the hinge bar and in which the said main upright may be moved vertically, a hinge member secured to the lower portion of the said main upright and having loose connection with the hinge bar, a clamp carried by the main upright that is capable of being operated to grip the hinge bar.

2. In a gate of the kind described, the combination of a hinge bar, arms carried by the hinge bar and which are capable of being secured to the gate post, a gate frame, a main upright on said gate frame, a yoke having loose connection with the hinge bar and in which the said main upright may be moved vertically, a hinge member secured to the lower portion of the said main upright and having loose connection with the hinge bar, a clamp carried by the main upright and capable of being operated to grip the hinge bar.

3. In a gate of the kind described comprising a main upright consisting of matched pieces secured on opposite sides of the rails, the combination of a hinge bar, opposed bent plates having inturned forward ends, and the rear portions being so formed with half eyes that when the said bent plates are secured together the main upright and the hinge bar will be engaged loosely, a hinge element at the lower end of the main upright, a means to clamp the main upright to the hinge bar.

In testimony whereof we affix our signatures in presence of two witnesses.

JOHN N. NEAL.
RANDALL T. VAN VALKENBURG.

Witnesses:
EDNA G. GENTRY,
JOHN W. RYAN.

---

Copies of this patent may be obtained for five cents each, by addressing the "Commissioner of Patents, Washington, D. C."